United States Patent Office 3,494,486
Patented Feb. 10, 1970

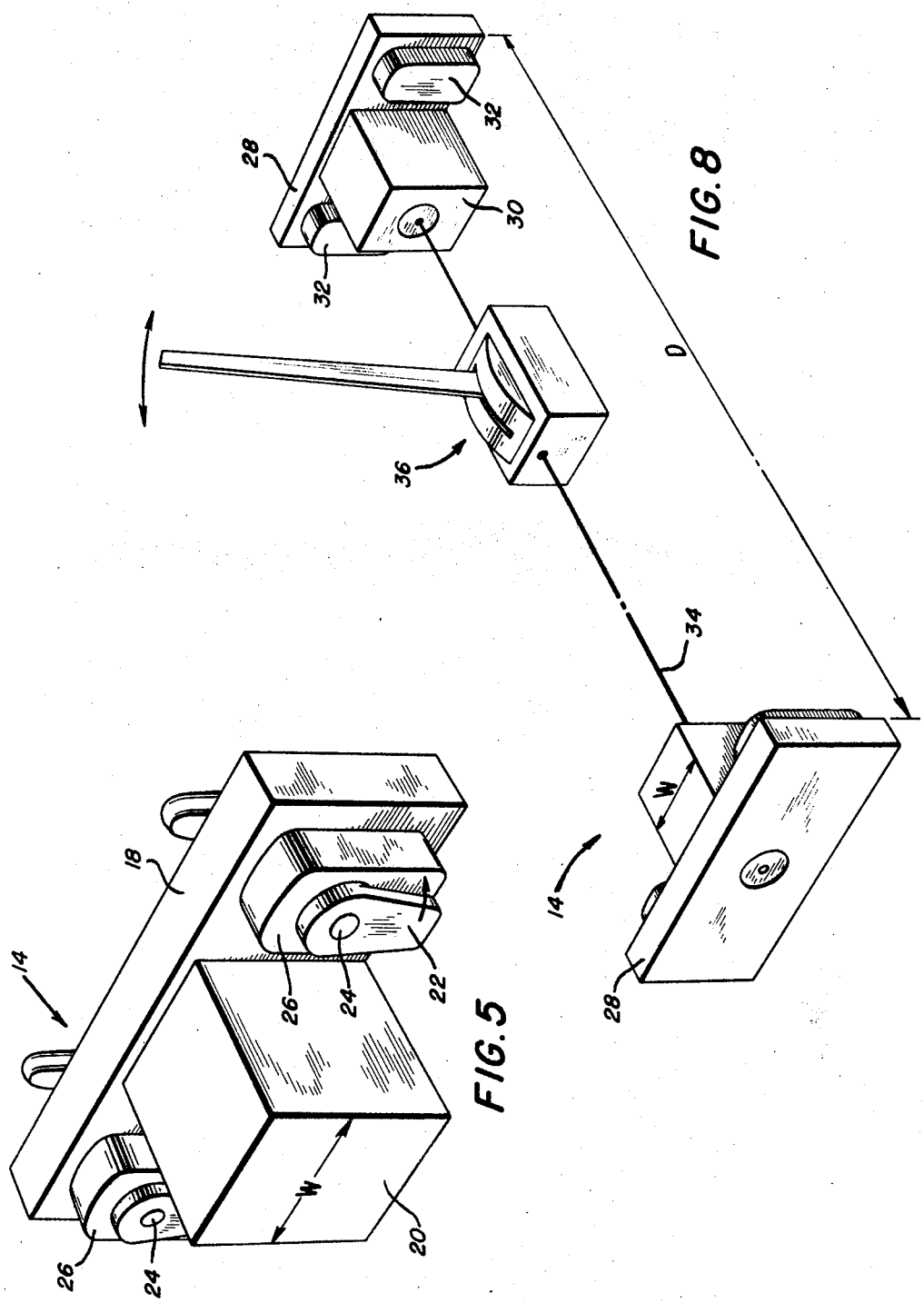

3,494,486
CONTAINER TRANSPORTING AND HANDLING SYSTEM
George R. Knight, Jr., Port Washington, N.Y., and Leopoldo C. Lafont, Newark, and Norman W. Penney, Ridgewood, N.J., assignors to John J. McMullen Associates, Inc., New York, N.Y., a corporation of New York
Filed May 26, 1967, Ser. No. 641,665
Int. Cl. B63b 27/10, 11/00
U.S. Cl. 214—15                                    6 Claims

ABSTRACT OF THE DISCLOSURE

A container ship having a cellular guide system to receive simultaneously two 20-foot containers arranged end to end and attached by a releasable connector. One embodiment includes midlength cell guides and can handle, for example, 20-foot units only and another embodiment includes only fore and aft cell guides and can receive two married 20-foot containers or one 40-foot container.

BRIEF SUMMARY OF PRIOR ART

Conventional designs for cellular container ships and systems for the loading and discharging thereof are such that containers can be only loaded or discharged therefrom one at a time. Thus, because of the great number of containers carried by the new large size container ships, the in-port time and turn-around time for the vessel is long and in one sense expensive because of the extended unproductivity of the ship. In addition, conventional cellular container ships suffer from the disadvantage that the cell guide system can handle but one size container or at best containers at specified size must be loaded at specific ship locations increasing the complexity of marshalling operations at dockside.

BRIEF DESCRIPTION OF THE INVENTION

The present invention overcomes the problems mentioned above by providing a container ship with a cell guide system that can receive either two containers at the same time permitting a quicker loading and discharge of the vessel or by receiving a container having length equal to the total dimension of the two aforementioned smaller containers without adjustment of the cell guide system. Thus, containers of these sizes can be loaded and unloaded through virtually any hold of the ship.

In one embodiment the ship according to the invention has a cell guide system designed to receive a standard ASA container of given length, for example 40 feet. However, two ASA 20-foot containers can be received by this system when, according to the invention, the containers are locked together physically and handled as a single unit by a solid spreader crane bar having a length equal to the sum of the two containers. Connecting fittings are provided at the lower and, if necessary, upper adjacent container corner castings so as to marry the containers as a unit and provide the proper spacing therebetween so that the overall length is equal to that required for the particular cell guide design.

Another embodiment includes a cell guide system for receiving simultaneously two containers handled by individual independent crane spreaders lifted by a single crane. The guide system comprises fore and aft guides and a set of midlength guides to receive the mutually adjacent corners of the containers and to restrain those parts of the container from movement at sea. Once the containers are released by the spreader bar, they are free and each unit of the pair must be individually restrained. One configuration of this embodiment includes a free-standing pillar-like midlength guide of cruciform cross section the tops of which fit into the underside of the hatch cover so that the guides are held rigid against motion while at sea. An alternate arrangement of this embodiment provides tension members of small thickness to reinforce and tie the midlength guides to the ship in the athwartship end fore and aft directions.

It is therefore an object of the invention to provide a container ship and crane system with doublelift capability and such versatility so as to receive at the same time either two longitudinally aligned smaller containers or one larger container having a length equal to the length of the sum of the smaller containers.

DESCRIPTION OF DRAWINGS

FIGURE 5 is a perspective of one preferred connecting fitting.

FIGURE 8 is a perspective of another preferred embodiment of a container-connecting apparatus.

FIGURE 17 is a top plan of a typical hold of the vessel of FIGURE 16a.

DETAILED DESCRIPTION OF EMBODIMENTS

Figure 1:
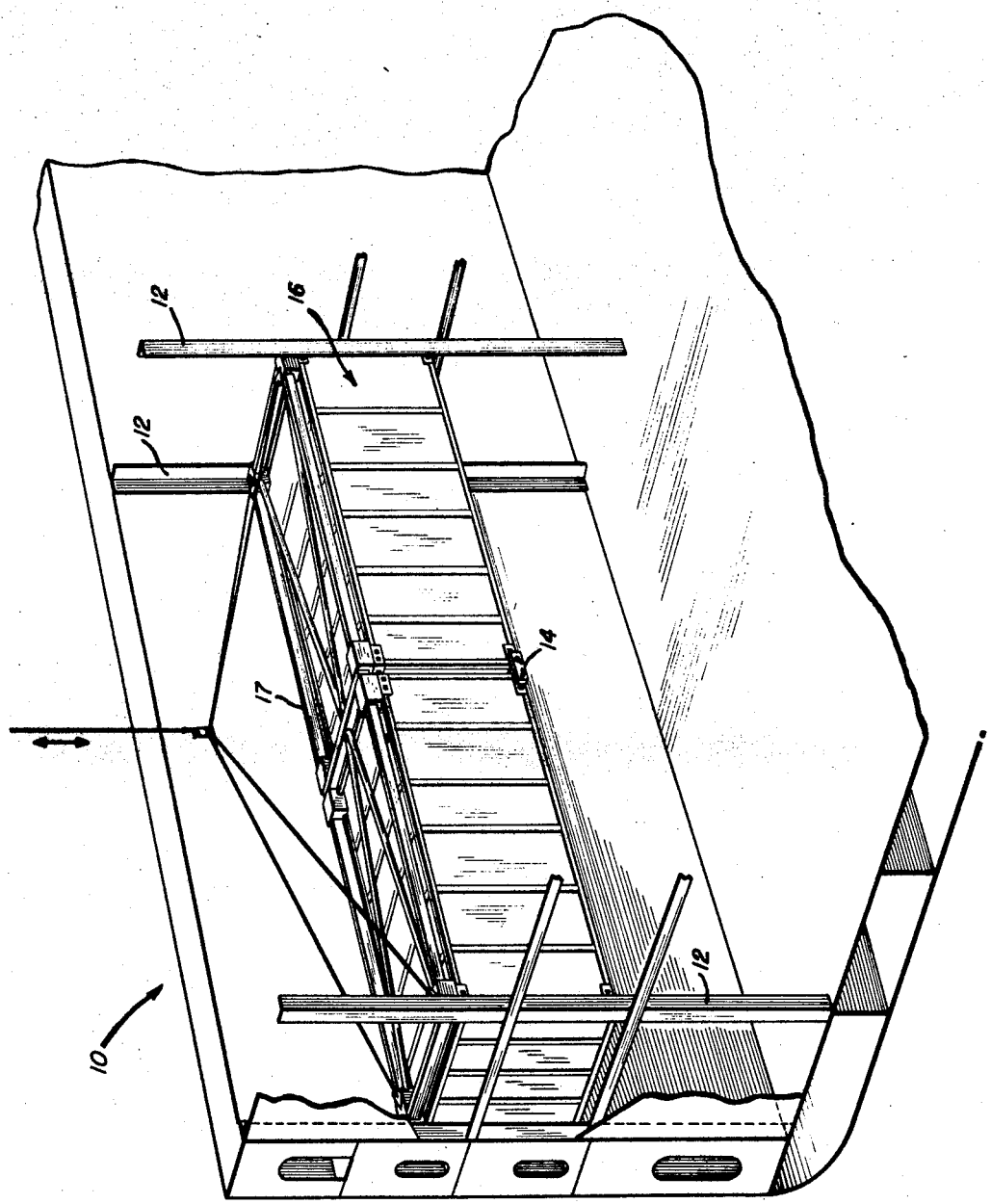
FIGURE 1 is a diagrammatic perspective of a vessel according to one embodiment of the invention. Parts of the vessel and cell guides are omitted for clarity.
Figure 2:
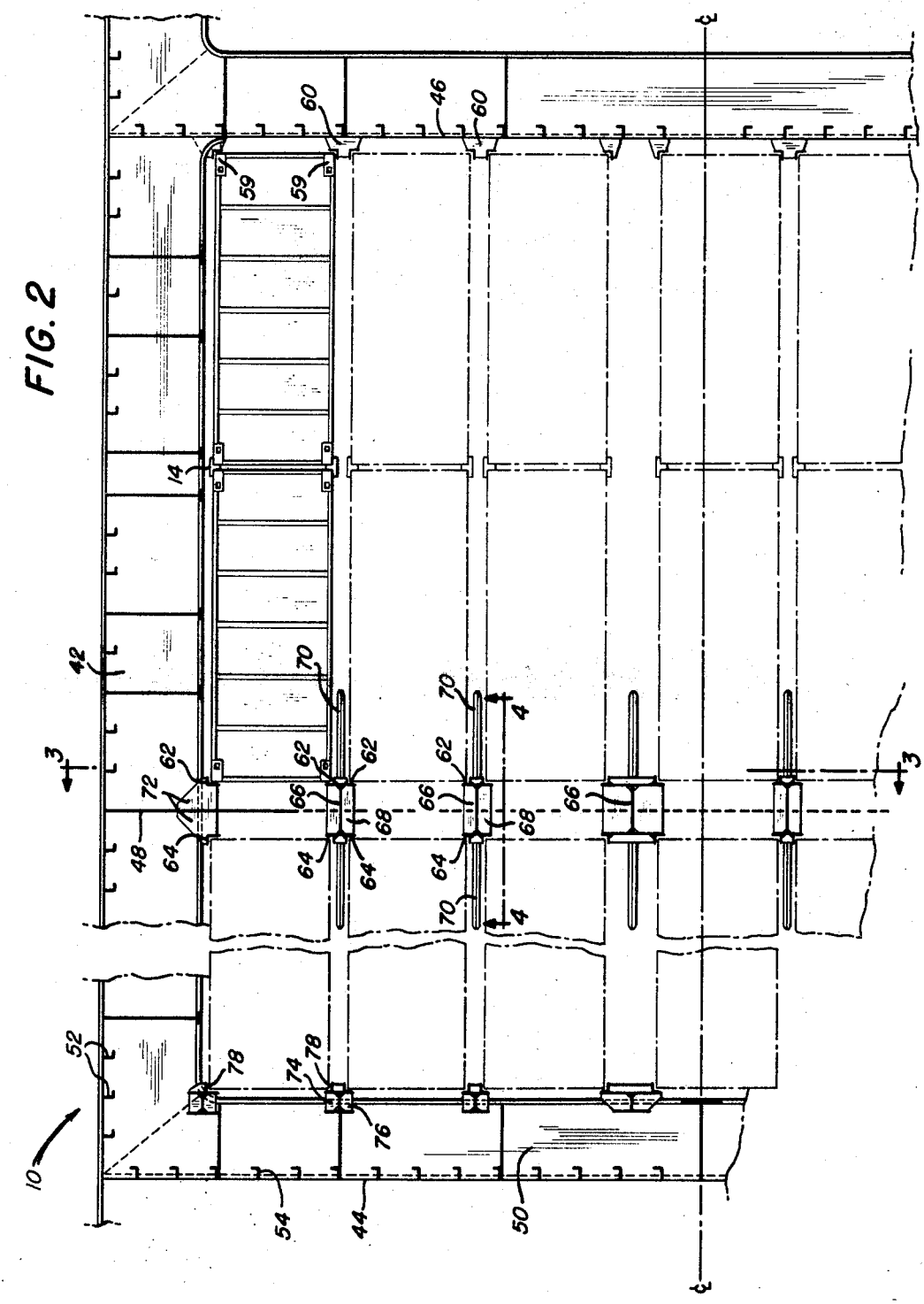
FIGURE 2 is a partial top plan looking into a typical hold of the vessel.

Referring to FIGURES 1 through 4, a one embodiment of the container ship according to the invention is generally designated 10 and includes a cell guide system throughout the cargo section of the ship designed to receive a container unit of particular dimension such as an ASA 40-foot container. To this end, cell guides 12 are arranged to receive the fore and aft corner posts of the container and the space in the longitudinal-vertical planes between longitudinally aligned guides 12 is free of obstructions so that, according to the invention, two smaller containers, for example two 20-foot containers, aligned end to end and married by a suitable connector can be received by the cell guides without modification.

The married containers 16 can be lifted to and from the cell guides 12 by a single ship-based or shore-based crane cooperating with two independent spreader bars or a single spreader bar 17. Connectors 14, preferably located at the adjacent lower corners of the married containers 16, provide proper spacing between container ends and remain with the containers during transport. For this reason, connectors 14 must be sufficiently strong to withstand dynamic forces tending to move the containers of the unit relative to each other. Upon reaching destination, the containers 16 are removed as a unit and connectors 14 are disengaged sometime after containers 16 are released by spreader bar 17. To avoid delays at dockside, the connectors 14 should be quick acting and dependable. Spreader bar 17 can provide a four point pickup for each container (8 points for each module) as illustrated or, alternately, it can lift the module at the four end points with a midlength spacer held in one of each pair of upper corner castings and having a spacing body held in compression between the two containers when the module is lifted.

Figure 7:
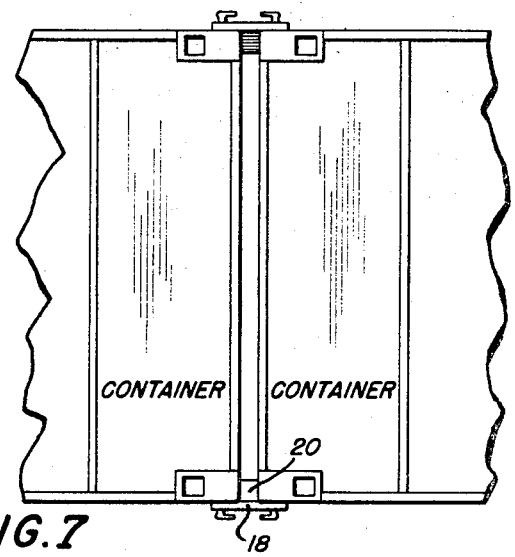
FIGURE 7 is a top plan of FIGURE 6.
Figure 6:
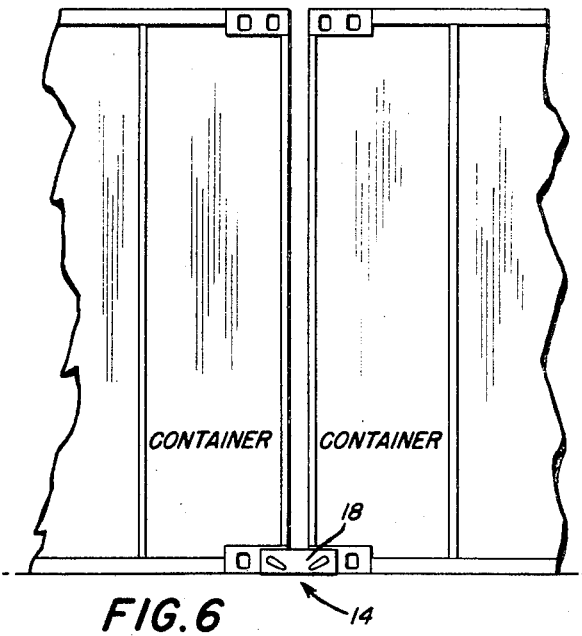
FIGURE 6 is a diagrammatic partial side elevation of two married containers with the fittings of FIGURE 5 in place.

One preferred form of connector fittings 14 is illustrated in FIGURES 5 through 7 and comprises a cast steel plate 18 having a rectangular boss 20 extending from the back face thereof. Boss 20 should have a width equal to the required spacing between the married containers. Also on the back face of plate 18 on either side of boss 20 there is provided a latch 22 fixed to a pin 24 which is rotatably held by plate 18 and connected to an operating knob or handle on the forward side of plate 18. Latch 22 is spaced from the back face of plate 18 by an elliptical boss 26 which fits into the similarly shaped opening of the corner casting of the container. The opening in the corner casting is key-shaped permitting the passage of latch 22 and the seating of boss 20 after the positioning of which latch 22 is rotated to the locked position making the connection secure. Since the crane spreader bar 17 provides an 8 point pickup, connectors 14 need only be installed at the bottom adjacent container corner castings. As can be seen in FIGURES 6 and 7, plate 18 extends slightly beyond the aligned sides of the container but the bottom of the plate is flush with the aligned bottoms of the containers. In this way, stacking the containers one on top of the other is not disturbed by the presence of connectors 14.

To disconnect the connectors and again make the containers independent, each latch 22 is rotated to the unlocked position and the two connectors are removed from each married pair of containers.

With reference to FIGURE 8, an alternate connector arrangement is illustrated and comprises a pair of cast steel plate members 28 having a rectangular boss 30 extending from the back face thereof and having a dimension equal to the designed spacing between the containers. Boss 32 is provided on each side of boss 30 at the back face of plate 28. To make the fitting secure, a wire cable 34 has opposite ends secured in each boss 30 of fitting 28. Intermediate the cable but adjacent one of the fittings 28 there is provided a conventional cam action wire rope takeup device 36.

In operation, each fitting 28 is fitted on and between the adjacent containers so that each boss 32 is received in a container corner casting in the same manner described above. When the fittings 28 are in place, device 36 is actuated and the previously slack wire 34 is tensioned thus pulling fittings 28 together so as to forceably seat bosses 32 in the receiving openings in the respective corner castings. To disengage fittings 28 and mutually release the containers from each other, device 36 is operated to add slacking to cable 34 sufficiently so that each fitting 28 is easily withdrawn so that boss 32 is taken from the respective opening in the container corner casting.

When two containers are married they must form a standard module. For example, a standard 20-foot ISO container is 19 feet and 10½ inches long. A standard 40-foot ISO container is 40 feet and zero inches long. Therefore, the marrying device must provide a 3-inch spacing between the containers.

Ship 10 having a cell guide system typical of handling the single or married containers described above is illustrated in FIGURES 2 through 4. The ship comprises an outer hull 38 with a double bottom 40 and box girders 42 formed by the main deck, second deck, hull and longitudinal bulkhead running along the sheer strakes of the hull. Transverse structural bulkheads 44 and 46 are provided at longitudinally spaced positions within the hull. In addition, transverse web frames 48 also serve to reinforce the vessel. Additional reinforcement is provided by horizontal girders 50 extending along the hull and transverse bulkheads as well as the vertical stiffening members 52 extending along the hull sides and members 54 welded to the transverse bulkheads.

An upstanding coaming 56 is secured to the upper deck 58 of the hull and extends around the enlarged hatches through which the container cargo is handled.

In order to optimize space usage and maintain the container cargo in an orderly fashion and secured in the ship, a cell guide system is provided within the holds and consists of a plurality of upstanding guides secured to the floor of the hold. The forward container guides 59 are secured to the rear of bulkhead 46 by horizontal spacing plates or diaphragms 60 welded to guides 59 and the bulkhead at suitable vertical locations. Gussets may be provided at the bottoms of girders 50 where necessary. Additional guide members 62 and 64 are welded to the fore and aft faces respectively of an elongated upstanding I-beam member 66 which is secured symmetrically fore and aft to web frame member 48. Horizontal plates 68 are welded to the web and flanges of the I-beam members 66 and guides 64 at vertically spaced locations for reinforcement purposes. Triangular gussets 70 with a flanged-free edge have one edge welded to the bottom of the hold and the vertical edge welded to the bottom part of the transverse web frame 48. Additional spacer plates 72 are provided to secure the outermost guides 62 and 64 in the vicinity of transverse web frame 48. Additional I-beam members 74 with reinforcing plates 76 are secured to the bottom of the hold and horizontal stringers 50 generally as shown. It is apparent that guides 58 and 62 form a plurality of cells so the storage of longitudinally aligned modules which also are aligned transversely across the vessel spaced from each other depending upon the available hold space and the transverse distance between transversely aligned guides. In the example shown, the center-most cell is not symmetrical with the centerline of the ship and the spacing between cells is designed accordingly. Additional cells are defined by guides 64 and 78 generally as shown.

Figure 3:
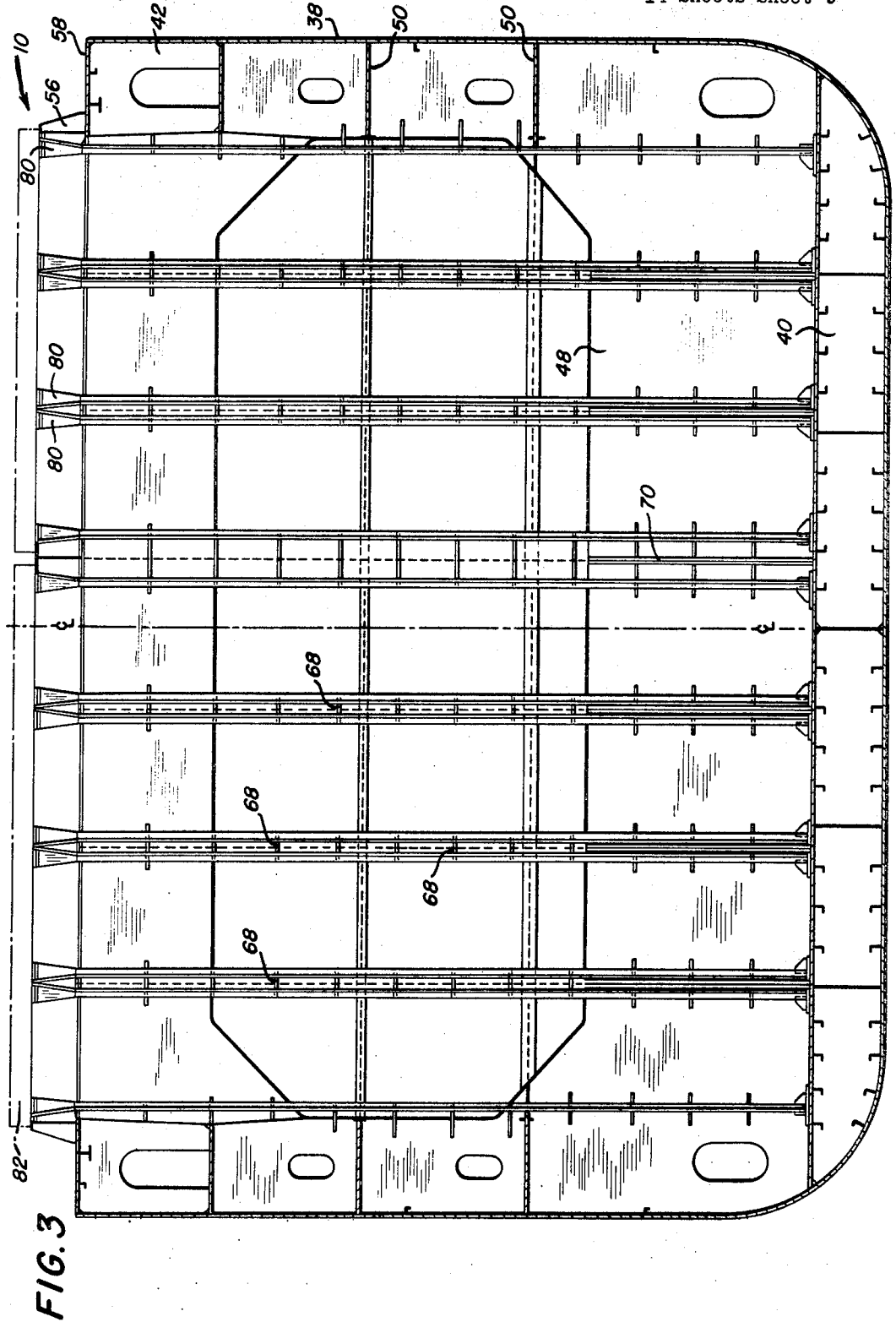
FIGURE 3 is a transverse vertical section along line 3—3 of FIGURE 2.
Figure 4:
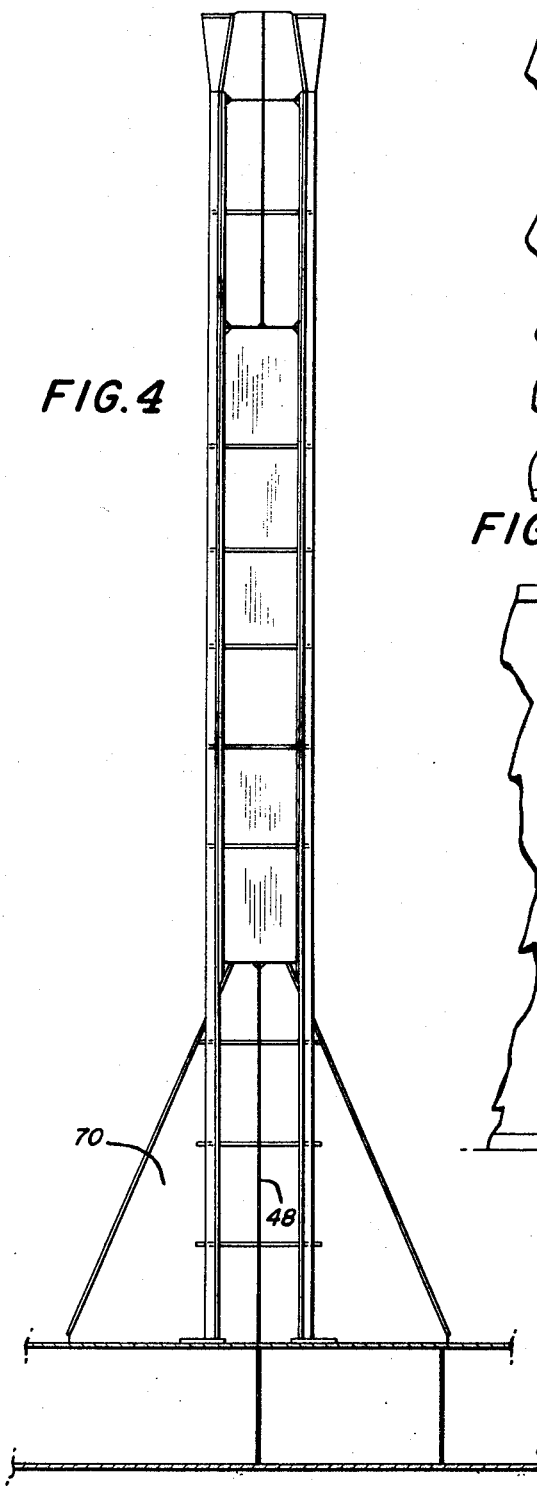
FIGURE 4 is a partial longitudinal vertical section along line 4—4 of FIGURE 2.

As better seen in FIGURE 3, each cell guide is provided with a chute 80 which has two intersecting sloping surfaces converging toward the top of the associated guide so as to channel the corner of the incoming container into vertical orientation with the vertical guide. The tops of all chutes 80 preferably lie in the same plane just below the bottom of the hatch cover 82 when the latter is in place.

In operation, the cell guide system of vessel 10 is designed to receive one relatively long module such as a 40-foot container in each cell or alternately, two married 20-foot containers connected as described above without readjustment or augmentation of the cell guide system. A number of containers are stacked one on top of the other within each cell depending upon the vertical dimensions of each container and the overall height of the cell. If desired or necessary, single 40-foot containers can be stored within the same cell as two married 20-foot containers.

The double lift capability and versatility of the invention affords faster vessel in-port turn around by reducing the number of crane cycles required to load or unload the vessel. In addition, better space utilization is achieved due to the elimination of bulky intermediate cell guide members. For example, if two 20-foot containers were stowed in individual vertical cells, as is normally the case, the total fore and aft distance required for stowage of two longitudinally adjacent containers would be about the sum of the following distances:

(a) single guide structure _____ 1'0"
(b) 20-foot container (incl. clearance) _____ 20'0"
(c) double guide structure _____ 2'0"
(d) 20-foot container (incl. clearance) _____ 20'0"
(e) single guide structure _____ 1'0"

Total _____ 44'0"

But with the present invention, two 20-foot containers are locked together and handled as a unit so that dimensions (c) above is saved since no midlength guide is required. Therefore, two feet are saved for every two containers in the longitudinal direction.

Figure 9:
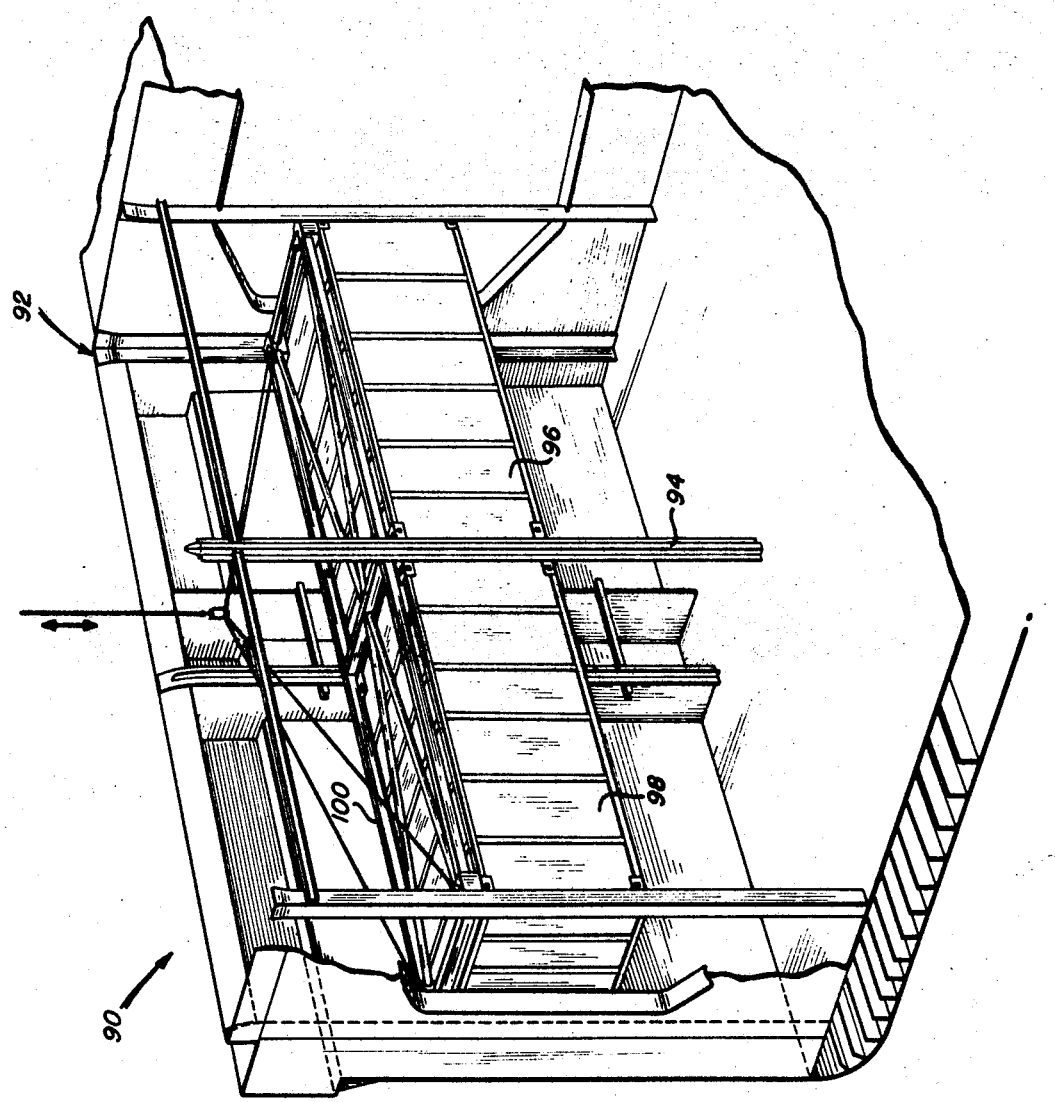
FIGURE 9 is a diagrammatic perspective view similar to FIGURE 1 illustrating an alternate system of vessel cell guides and container handling method.
Figure 10:
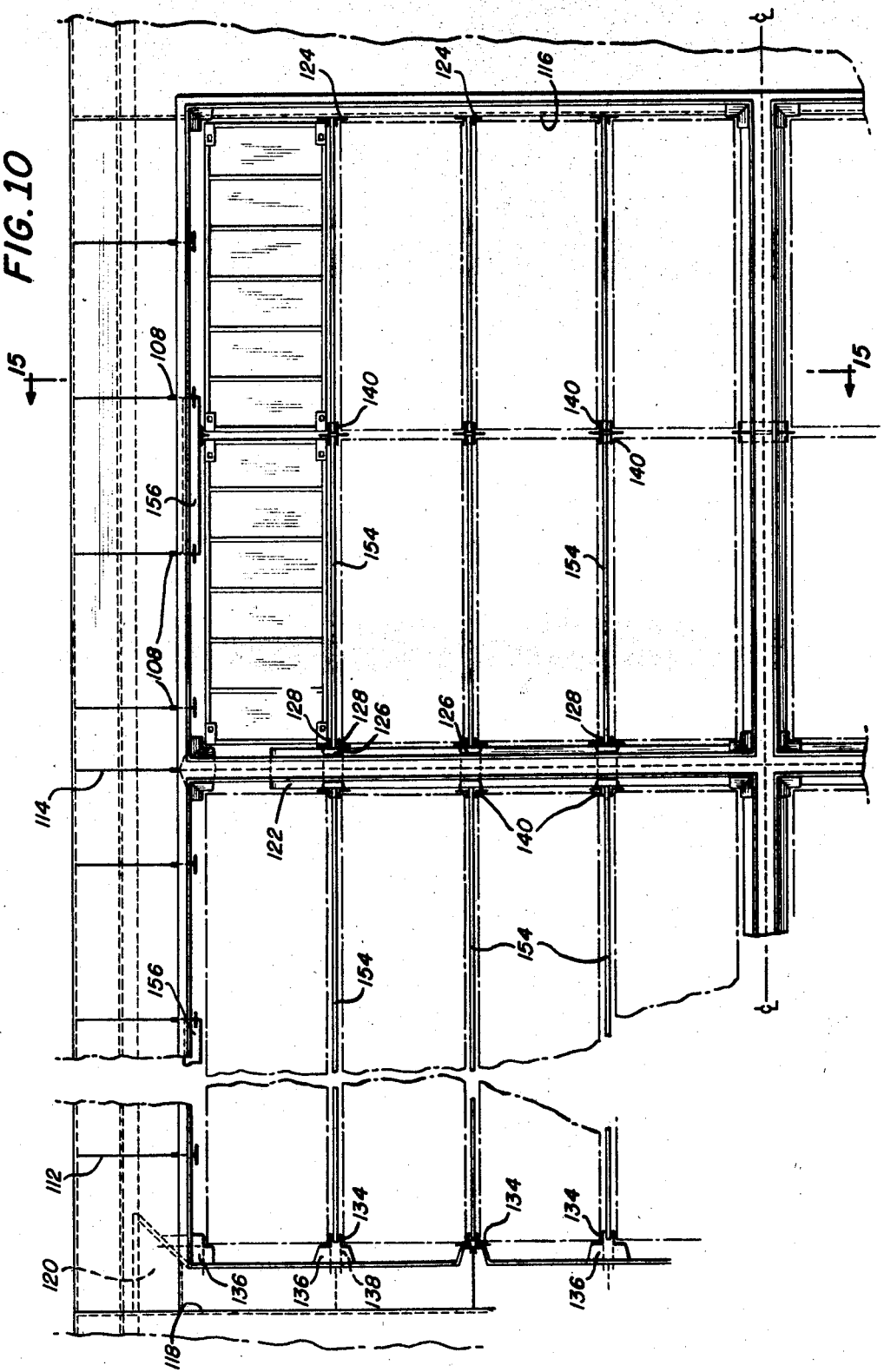
FIGURE 10 is a horizontal section of a typical hold of the vessel of FIGURE 9.

Although the method and system for double lifting and storing two containers as one module has particular advantages, it may be the case that necessary marshalling yard procedure does not permit physically connecting two containers together. For this reason, an alternate embodiment of the invention provides a guide system having midlength guides so that two containers can be simultaneously delivered to or removed from a cell by a single crane with appropriate cooperating spreader bars as disclosed hereinafter. FIGURE 9 shows a vessel 90 having a guide system 92 secured within the cargo section of the ship and having midlength guides 94 positioned so as to receive the adjacent corners of a double lifted unmarried pair of containers 96 and 98 handled by spreader bars 100 and a single shore based or vessel based crane (not shown). Spreader bars 100 can be notched as shown to accommodate the midlength guides 94. After the containers are released by the spreader bar, they are free and each container 96 and 98 is independently restrained by the guides at each of the four corners thereof.

With reference to FIGURES 10 through 15, vessel 90 includes a hull 102 with a double bottom 104 and main deck 106 with an upstanding coaming 108 mounted thereon about the large hatch therein facilitating the handling of containers therethrough. Longitudinal stiffeners 110 and transverse web frames 112 serve to reinforce the cargo section of the hull. Transverse web frames 114 are also provided approximately equal distance from fore and aft transverse structural bulkheads 116 and 118. Horizontal stringers 120 are provided on the bulkheads where necessary. Flange plate 122 is secured to the inner opening of transverse web frame 114.

Figure 11:
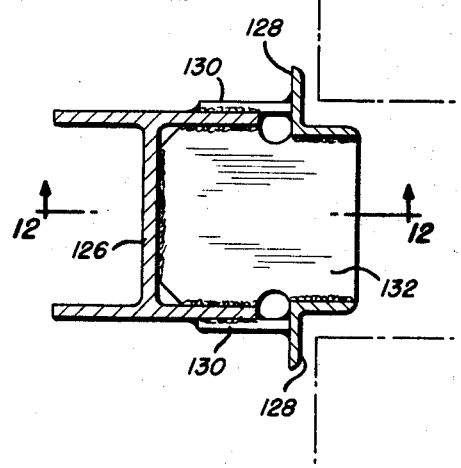
FIGURE 11 is a horizontal section through one of the supports for the cell guides nearest the transverse web frame.
Figure 12:
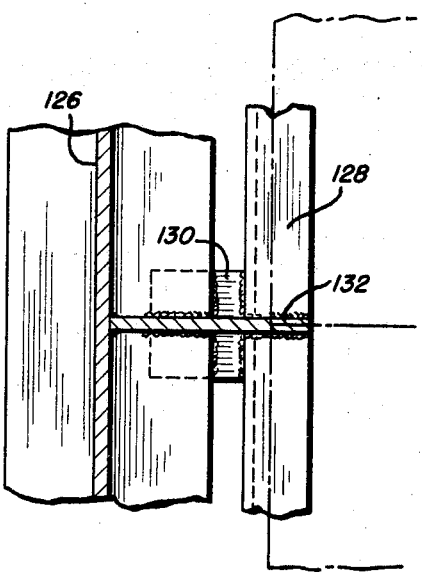
FIGURE 12 is a longitudinal vertical section along line 12—12 of FIGURE 11.

The cellular guide system includes forward guides 124 secured to the back face of bulkhead 116 and upstanding support members 126 of I-beam construction welded to flange 122 for the purpose of securing guides 128 in vertical positions. Specifically, as seen in FIGURES 11 and 12, guides 128 are secured to members 126 by a pair of spaced vertical welding plates or diaphragms 130 and a horizontal diaphragm 132, these connections being made at spaced vertical locations throughout the height of members 126. Rear cell guides 134 are supported by spacer plates or diaphragms 136 suitably secured to the stringers 120. Suitable triangular gussets 138 are provided to increase the bending modulus of the connection.

Figure 13:
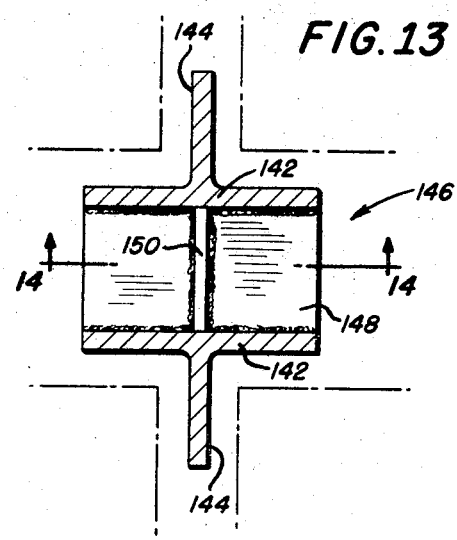
FIGURE 13 is a horizontal section through one of the midlength cell guides.
Figure 14:
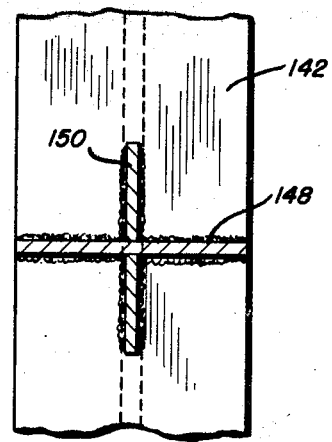
FIGURE 14 is a longitudinal vertical section along line 14—14 of FIGURE 13.
Figure 15:
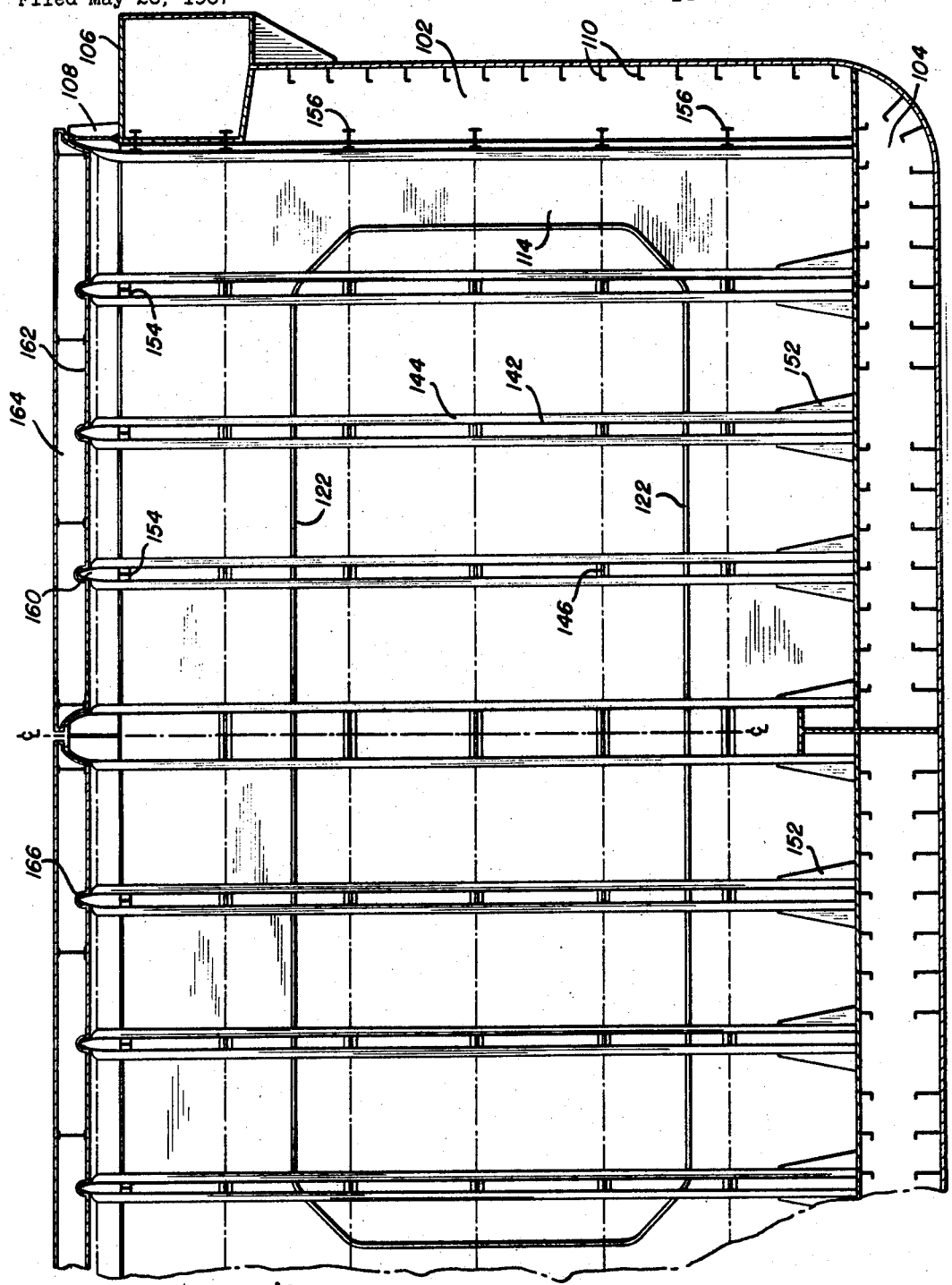
FIGURE 15 is a transverse vertical section along line 15—15 of FIGURE 10.
Figure 16:
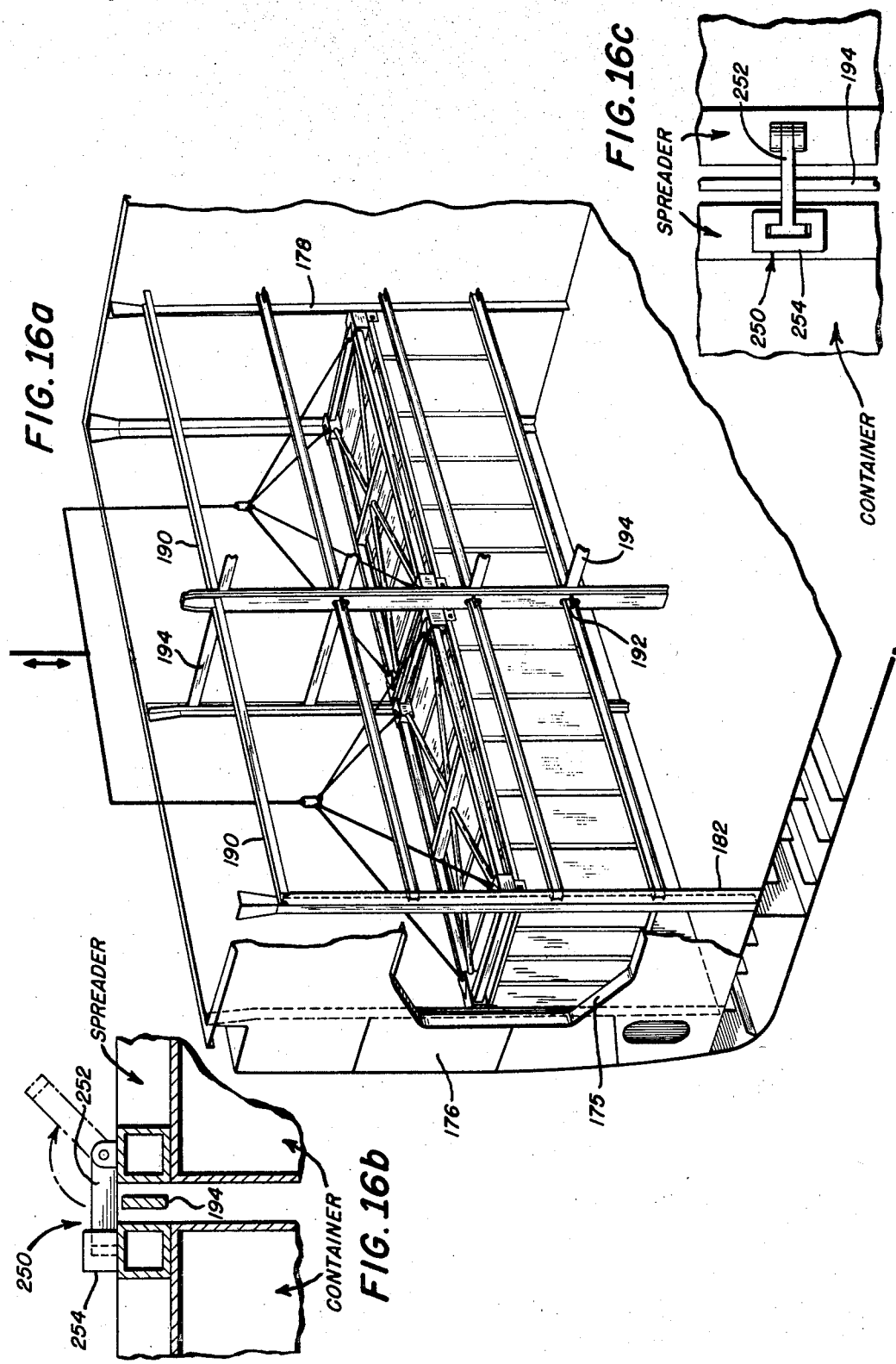
FIGURE 16a is a diagrammatic perspective view similar to FIGURE 1 of another system embodiment of the invention.
FIGURES 16b and 16c are partial longitudinal vertical section and top plan views of a spreader bar latch.
Figure 17:
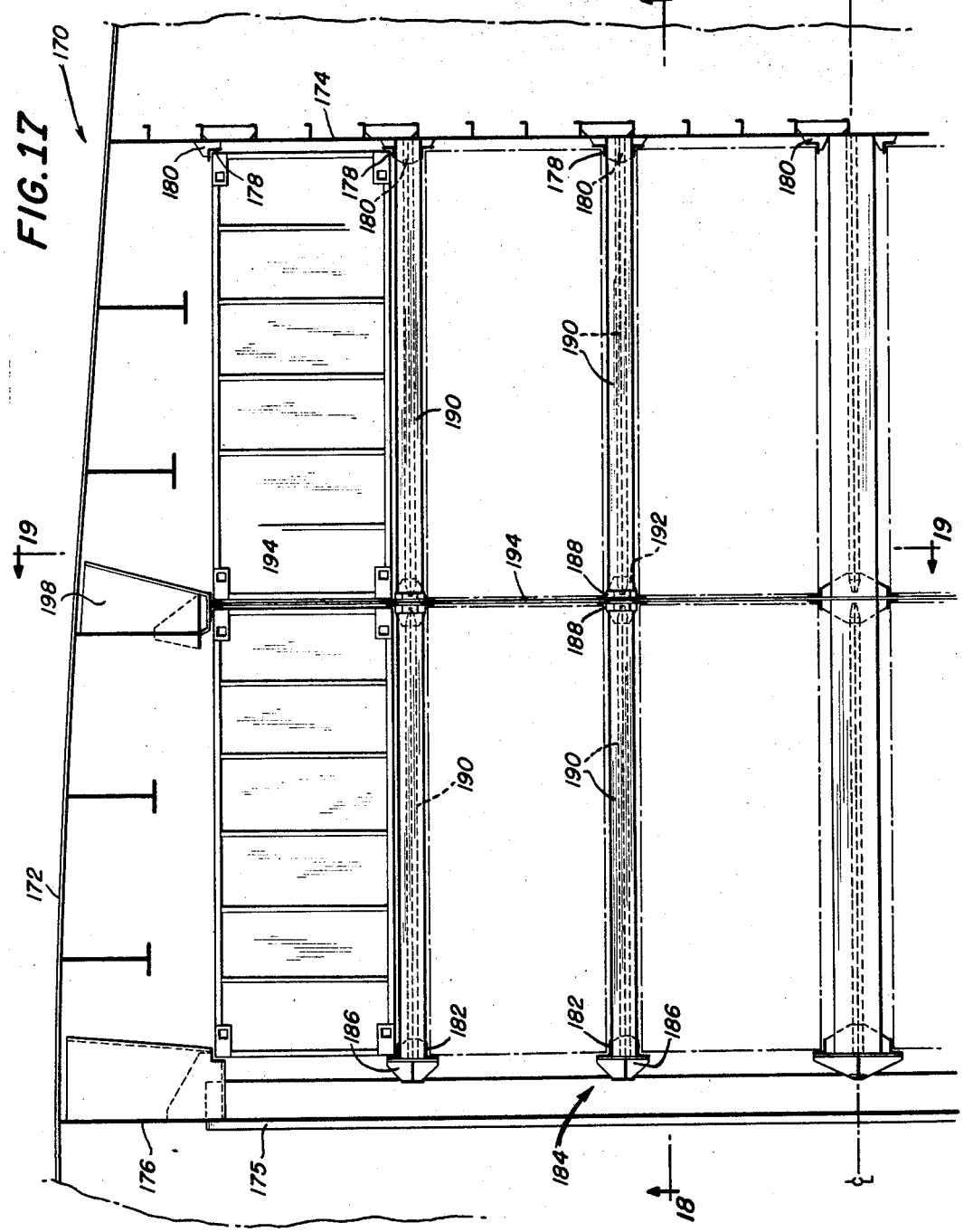

The midlength guides 140 are in the form of a pair of elongated members each having a T-shaped profile 142 as better seen in FIGURES 13 and 14. In this way, leg 144 cooperates with each arm of the T to form a separate guide to receive the associated corner of the incoming container. A spacing and reinforcing member 146 comprising a horizontal plate 148 and vertical plates 150 welded thereto secure members 142 as a rigid unit. Such members 146 are preferably located approximately at every 8-foot interval above the hull bottom. Brackets 152 secured to the bottoms of guides 140 and the bottom of the hold increase the upstanding stability of the free standing guide members. To further reinforce said guide members, I-beams 154 extend from members 126 through guides 140 to guides 134 and are connected by welding or the like to each set of guides. Beams 154 serve to stabilize the free standing guides 140 during loading and unloading of the container cargo.

The outermost guides 140 are held by suitable horizontal members 156 (such as beams or the like) secured to the hull web structure of vessel 90. The guides nearest the centerline are supported by suitable means such as upstanding pillars or supports mounted along the centerline of the vessel.

To further reinforce the free standing guides 142 against the dynamic forces of the container cargo when at sea, an upstanding dome 160 is provided at the top of each set of guides 142 and projects upward beyond the plane of the hatch cover bottom 162 when the hatch cover 164 is in place on coaming 108. The bottom of hatch cover 164 is provided with a number of cavities 166 which receive the domes 160. Thus, when the hatch cover 164 is in place, the free standing midlength guides are secured.

With the system shown, two longitudinally aligned containers can be lifted with a solid spreader bar and received by the cell guide system as described.

A further embodiment of the invention is illustrated in FIGURES 16 through 22 and includes a cellular guide system with midlength guides of light construction reinforced athwartship and fore and aft by thin tension members. Two independent lifting spreaders normally locked to one another end to end when outside the container cells are used with a single crane to load and unload the container cargo. Once the bottom of the containers enters the guide system, the spreaders are disconnected. Releasable latches may be used for this purpose which automatically release when they strike the transverse tension members 194. One suitable form of such a latch is shown in FIGURES 16b and 16c. Latch 250 includes an operating arm 252 rotatable on one of the transverse pieces of one spreader and a retainer 254 fixed to the transverse piece of the other spreader and shaped to receive the enlarged end of arm 252 to prevent relative translatory movement of the spreader bars. As the assembly is lowered into the cell guides, arm 252 strikes tension members 194 and rotates as shown so as to disengage retainer 254. The now independent spreader bars continue to lower until the containers are fully seated. In detail, ship 170 having hull 172, transverse bulkheads 174 and 176 houses a cellular guide system in the cargo section of the hull. Forward guides 178 are secured to bulkhead 174 by plates 180 and the aft guides 182 are held by vertical I-beam members 184 which are in turn secured to flange 175 of web 176.

The midlength guides 188 are provided generally as shown and are secured fore and aft joists 190 mutually secured with guides 188 to horizontal chocks 192, the fore and aft ends of said joists 190 being tied to the supporting ship's structure, namely, bulkhead 174 and web 176 respectively. The connection to web 176 is of course made through member 184 and flange 175. To further reinforce guides 188, transverse tension bar 194 has its vertical faces secured to chocks 192 and guides 188, said bar 194 extending athwartship and having its outboard end suitably secured to brackets 198 or the like which suitably secure the outboard end of member 194 to the ship's hull or other supporting ship's structure.

Thus, the midlength guides 188 are secured in the fore and aft athwartship direction by the tensioning framework formed by joists 190 and tension bars 194. It is preferred that bars 194 and joists 190 be arranged in the same horizontal planes and the number of sets thereof depend upon the expected dynamic loads encountered at sea.

Figure 18:
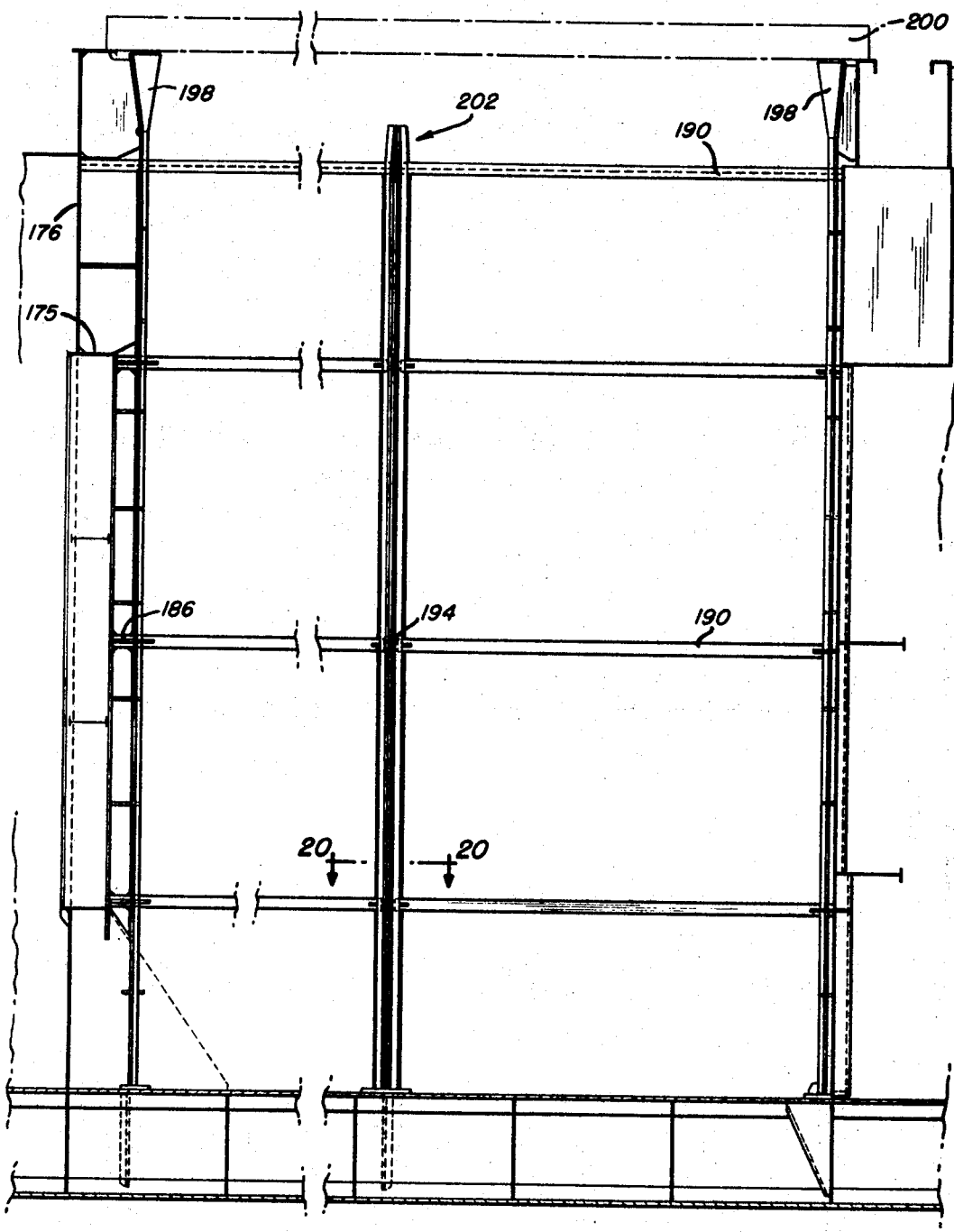
FIGURE 18 is a longitudinal vertical section along line 18—18 of FIGURE 17.
Figure 19:
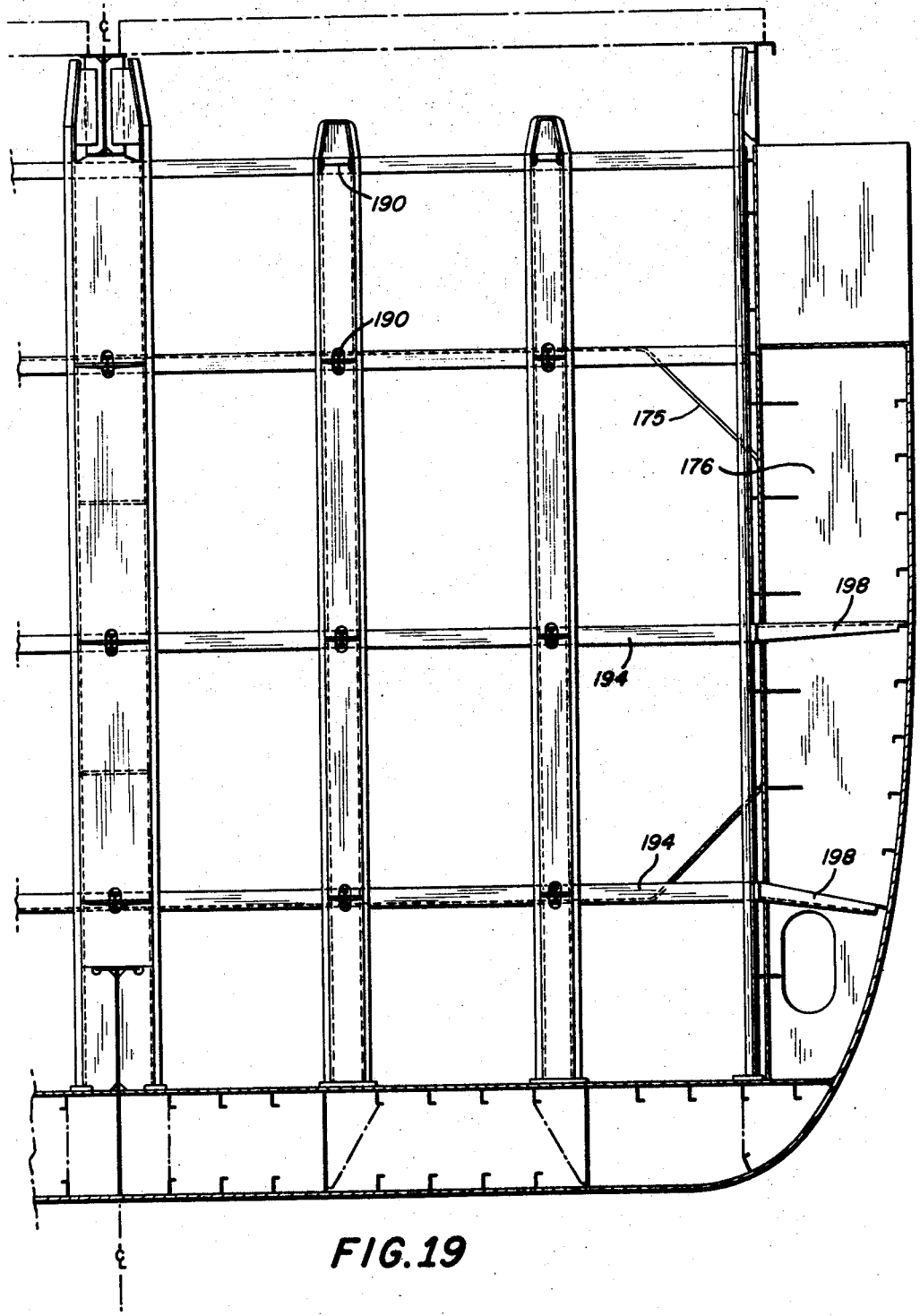
FIGURE 19 is a transverse vertical section along line 19—19 of FIGURE 17.
Figure 20:
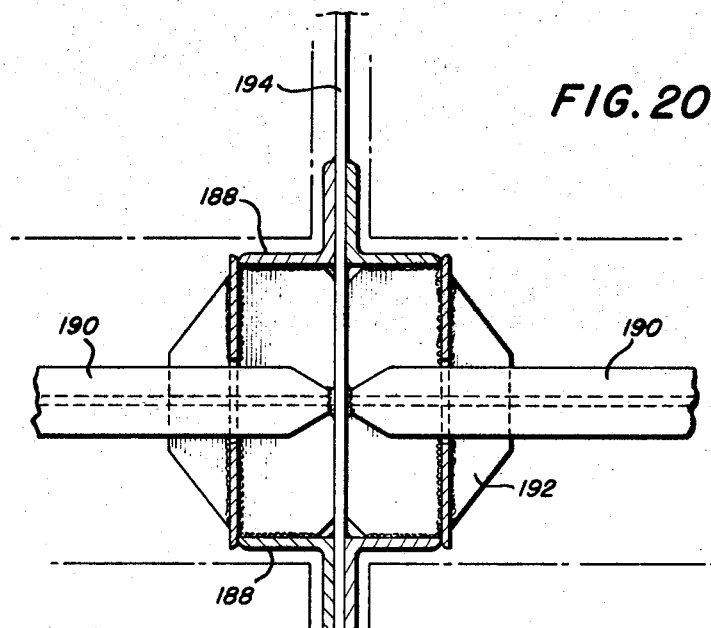
FIGURE 20 is a horizontal section along line 20—20 of FIGURE 18.
Figure 21:
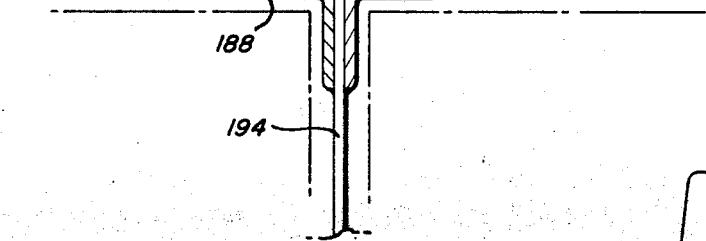
FIGURES 21 and 22 are exploded partial side and front elevations respectively of the tops of the midlength cell guides.
Figure 22:
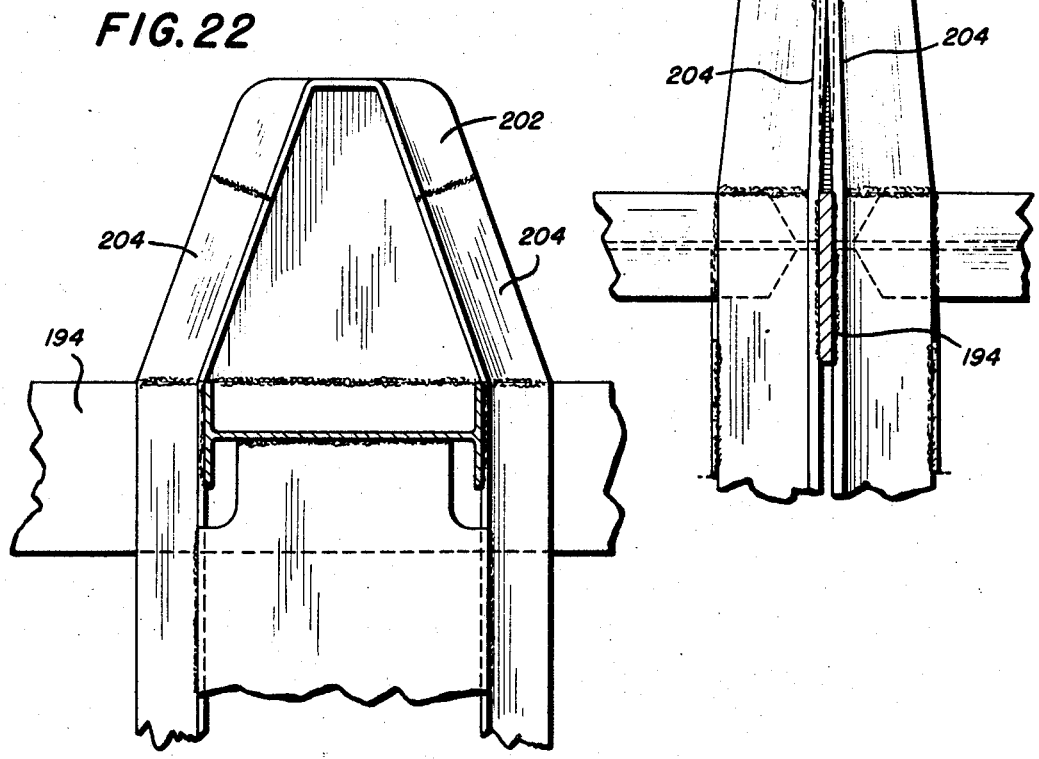

The fore and aft guides 178 and 182 are fitted with top guides 198 which serve to guide the container corner into the respective cell guide. The tops of top guides 198 are located just below plane of the hatch cover 200 when the latter is in place. The midlength guide members 188 are provided with a U-shaped top guide 202 in which each leg 204 forms two guides for the associated guides 188. As seen in FIGURE 18, the top of top guide 202 is well below the bottom of hatch cover 200 when the latter is in place.

The operation of this embodiment is the same as that described above in that containers are fed and removed two at a time from each cell and after release by the spreader bar, each container is individually held by either fore or aft guide members and midlength guide members. Dynamic forces at sea are counteracted by the tension members as described.

Various modifications can be made to the herein disclosed embodiments of the present invention without departing from the spirit and scope thereof.

What is claimed is:

1. A system for handling and transporting a pair of containers comprising a vessel having a cell guide system comprising vertical end guides to receive the extreme corners of two containers when they are arranged end-to-end, and a pair of midlength vertical guides to receive the mutually adjacent corners of the two containers when arranged end-to-end, a pair of equal length containers arranged end-to-end, spreader bar means releasably engaging the tops of the containers to marry and permit handling the containers as a single module, said spreader bar means providing a space between the adjacent container ends to accommodate parts of the midlength guides, said spreader bar means releasing the containers after the containers are fully seated with the cell guide system, said spreader bar means including a single spreader bar extending generally the entire length of the two-container module and having a midlength dimension less than the distance between said midlength guides, the space between said midlength guides being free from obstructions to permit vertical movement of the spreader bar therethrough, and a member coupled from at least one of the midlength guides to the vessel's structure and arranged in a plane generally parallel with the long dimension of the two-container module when seated therein for reinforcing said one midlength guide.

2. A system as set forth in claim 1 wherein said members are spaced vertically from each other and extend from said one midlength guide to the two nearest end guides and being coupled thereto.

3. A system as set forth in claim 2 wherein said vessel includes a hatch cover removably supported by the hull of the vessel above said one midlength guide, said hatch cover having means receiving an upper part of said one midlength guide to assist in the stabilizing thereof against movement.

4. A system for handling and transporting a pair of containers comprising a vessel having a cell guide system comprising vertical end guides to receive the extreme corners of two containers when they are arranged end-to-end, and a pair of midlength vertical guides to receive the mutually adjacent corners of the two containers when arranged end-to-end, a pair of equal length containers arranged end-to-end, spreader bar means releasably engaging the tops of the containers to marry and permit handling the containers as a single module, said spreader bar means providing a space between the adjacent container ends to accommodate parts of the midlength guides, said spreader bar means releasing the containers after the containers are fully seated with the cell guide system, reinforcement members extending from one midlength guide to the other and rigidly coupled to the midlength guides and the vessel's structure to reinforce said one midlength guide, said spreader bar means comprising a pair of spreader bars each engaging the top of one of the containers, and latching means for temporarily connecting the spreader bars together in spaced and end-to-end relation and arranged to move out of the path of said reinforcement members for unlatching when the two-container module is lowered into the guide system.

5. A system as set forth in claim 4 wherein said latching means includes a connecting arm pivoted on one spreader bar and having an end received by a device on the other spreader bar to prevent relative lateral movement, said arm striking the topmost member and being rotated thereby free of said device as the two container module is lowered into the guide system.

6. A system as set forth in claim 4 wherein further members are provided which extend from said one midlength guide to the two nearest end guides and which are coupled thereto and to the vessel structure to further reinforce said one midlength guide.

References Cited

UNITED STATES PATENTS

| 1,983,053 | 12/1934 | Spiegl | 294—67 |
| 2,963,310 | 12/1960 | Abolins. | |
| 3,061,134 | 10/1962 | Fesmire et al. | 220—23.4 X |
| 3,169,648 | 2/1965 | Tantlinger | 193—38 X |

GERALD M. FORLENZA, Primary Examiner

F. E. WERNER, Assistant Examiner

U.S. Cl. X.R.

294—67